United States Patent

[11] 3,577,061

| [72] | Inventor | Peter J. Wyles<br>Stamford, England |
| [21] | Appl. No. | 746,108 |
| [22] | Filed | July 19, 1968 |
| [45] | Patented | May 4, 1971 |
| [73] | Assignee | Newage Lyon Limited<br>Stamford, England |
| [32] | Priority | July 19, 1967 |
| [33] | | Great Britain |
| [31] | | 34274 |

[54] CONTROL APPARATUS FOR ELECTRIC ALTERNATORS
1 Claim, 1 Drawing Fig.

| [52] | U.S. Cl. | 322/27, 322/60 |
| [51] | Int. Cl. | H02p 9/08, H02p 9/14 |
| [50] | Field of Search | 322/25, 27, 28, 60 |

[56] References Cited
UNITED STATES PATENTS

| 3,470,456 | 9/1969 | Reinert | 322/28X |
| 2,531,062 | 11/1950 | Le Tourneau | 322/27 |
| 2,879,465 | 3/1959 | Wood | 322/27 |
| 3,151,288 | 9/1964 | Avizienis et al | 322/28 |

*Primary Examiner*—Benjamin Dobeck
*Assistant Examiner*—H. Huberfeld
*Attorney*—Watson, Cole, Grindle & Watson

ABSTRACT: In automatic regulating apparatus for an electric alternator a main thyristor is connected in series with an excitation winding across the alternator terminals and is controlled by a sensing circuit to which a signal corresponding to the alternator output voltage is passed. A saturable current transformer has a primary winding in the load circuit of the alternator and a secondary winding connected through a rectifier to the excitation coil to build up the excitation when the alternator has to start up under a permanently connected load, without interferring with control once the voltage has built up.

PATENTED MAY 4 1971 3,577,061
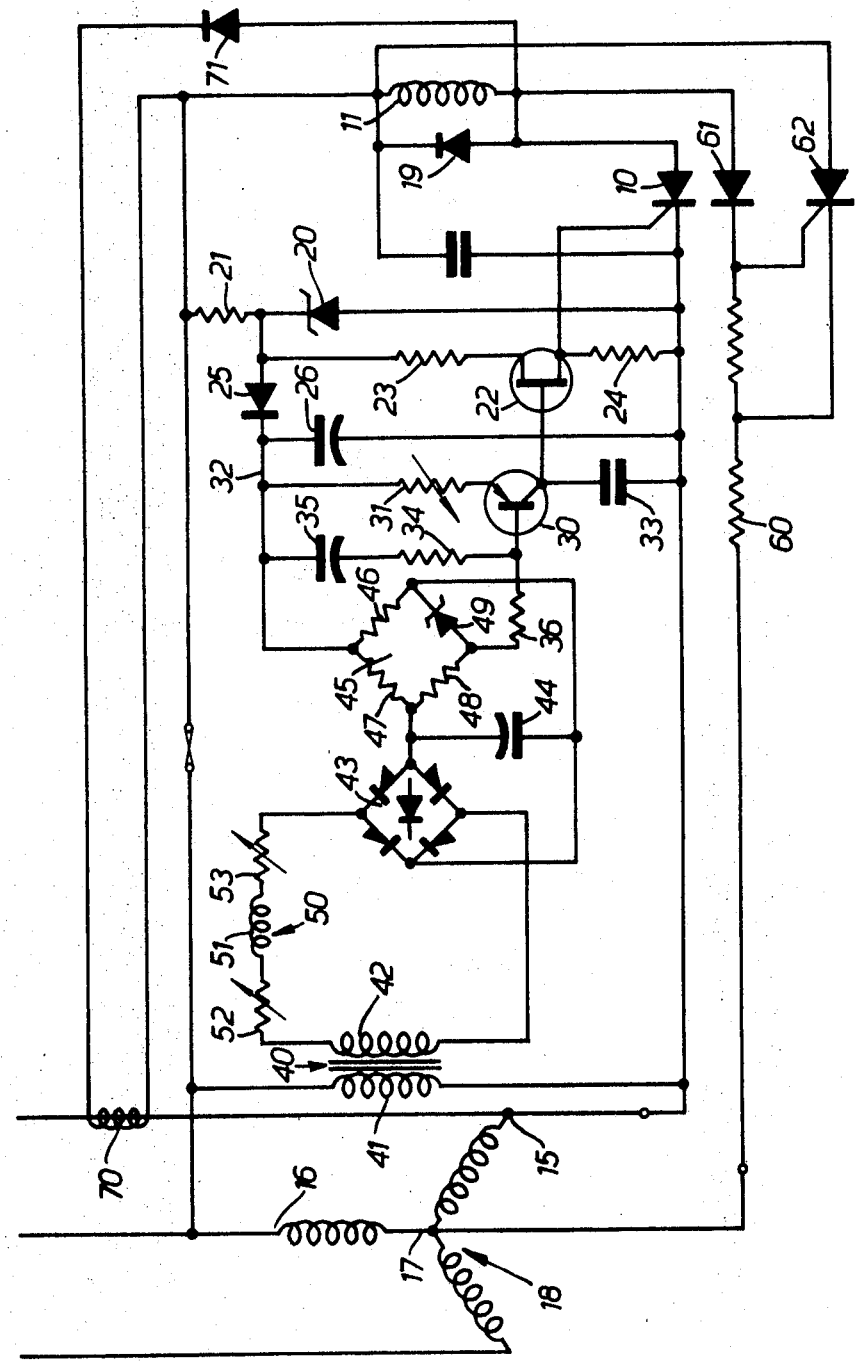
INVENTOR
PETER JOHN WYLES.
BY
Watson, Cole, Grindle & Watson
ATTORNEY

CONTROL APPARATUS FOR ELECTRIC ALTERNATORS

This invention relates to control apparatus for electric alternators, of the type having a circuit including an excitation coil by which the excitation of the alternator is produced or controlled, connected to the output of the alternator in series with a current control device, conveniently a thyristor, for controlling the current through the coil. The excitation coil may in some cases be the field winding of the alternator itself while in other cases it may be the field winding of an auxiliary exciter for the alternator.

The invention is particularly, though not exclusively, applicable to control apparatus of the type in which the terminal voltage of the alternator is compared with a constant datum or reference voltage to give an error signal. The error signal is applied to the input of a transistor powered by a clipped rectified voltage from the output of the alternator. The transistor controls the rate of charging of a capacitor during each cycle. The capacitor voltage controls the firing of a unijunction or double-base transistor, and the latter triggers the firing of a thyristor in series with the excitation coil, the latter being shunted by a freewheeling diode.

In order to derive the error signal from the sensed signal the sensed signal may be applied to a bridge network incorporating a Zener diode.

According to the present invention the apparatus includes a saturable current transformer having a primary winding in the load circuit of the alternator and a secondary winding connected through a rectifier to the excitation coil. This arrangement assists in building up the voltage, especially under difficult conditions, for example when the alternator may have to start up under a permanently connected load. The saturable transformer is designed so as to provide a useful excitation current at quite a small load current, but, due to saturation, will provide no substantially greater excitation current however much the load current may increase. A particularly valuable feature of this aspect of the invention is that a standard accessory can be employed with a variety of alternators having different load current ratings, once the transformer is saturated, the additional load current has no effect on its output.

The invention may be put into practice in various ways but one specific embodiment will be described by way of example with reference to the accompanying drawing, in which the single FIG. is a circuit diagram of an automatic thyristor control for an alternator.

The current transformer 70 and diode 71 form the subject of the present invention.

The control apparatus is of known type employing a thyristor 10 in series with an excitation coil 11. In some cases this may be the actual field winding of the alternator but in the actual embodiment described it is the field winding of an auxiliary exciting generator which in turn supplies the field winding of the main alternator.

The excitation winding is connected in series with the thyristor across two phase terminals 15 and 16, of the alternator 18, and is shunted by a diode 19, termed a freewheeling diode, which allows the circulating current to continue to flow through the excitation winding when the thyristor is switched off.

The thyristor 10 is provided with a firing circuit powered from a controlled supply represented by a Zener diode 20 connected in series with a resistor 21 across the same two phase terminals 15 and 16. The firing circuit comprises a unijunction transistor 22 having its bases connected across the Zener diode in series with a pair of resistors 23 and 24, one base resistor 24 being connected between the cathode and trigger of the thyristor.

The same Zener diode 20 is connected, through a diode 25, to a supply capacitor 26 providing a supply for a timing circuit. The timing circuit comprises a transistor 30 having its emitter connected through a variable resistor 31 to the positive terminal 32 of the supply capacitor and its collector connected to the unijunction transistor input, and also through a timing capacitor 33 to the negative terminal of the supply. The base is connected through a resistor 34 and capacitor 35 to the positive terminal 32 of the supply to give stabilization, and in addition is connected through a resistor 36 to a sensing circuit.

The sensing circuit is supplied from an isolating voltage transformer 40 having a primary winding 41 connected across the same two phase terminals 15 and 16 and a secondary winding 42 connected to a bridge rectifier 43 whereof the output is connected to the input of a bridge network 45 comprising three resistor arms 46, 47 and 48 and a Zener diode 49. The bridge is further protected by a capacitor 44 connected across its input to clip any high transient voltages.

Connected in series with the secondary winding 42 and the input to the bridge rectifier 43 is an impedance unit 50 comprising an inductor 51 and variable resistors 52 and 53 of which the former can be replaced or short circuited by a short-circuiting link if not required. The purpose of the inductor 51 is discussed below.

The bridge network 45 is set by the variable resistors 52 and 53 to be balanced at a predetermined alternator output voltage, and any change of the alternator voltage from this value will produce an error signal in one direction or another, at the bridge output, which is connected between the base of the transistor 30 and the positive supply terminal 32.

This provides a very simple and convenient way of deriving an error signal, but it will be appreciated that other methods of doing this may be employed if preferred.

The inductor 51 provides a very simple form of frequency-sensitive control. The inductor has a comparatively high reactance so as to drop a substantial portion of the voltage of the secondary winding 42, the amount depending on the frequency. Thus for example if the frequency falls, the reactance of the inductors falls and the voltage applied to the network 45 is increased thereby causing the control circuit to reduce the excitation and lower the alternator output voltage. At this reduced level, however, the regulator still retains its close voltage-regulating performance with variation of load. The ratio of the transformer 40 may be variable to enable an increased secondary voltage to be employed when the inductor 51 is included.

With the arrangement as so far described, difficulty may be experienced in obtaining satisfactory buildup of the alternator voltage. Thus when the alternator is started, the initial voltage is that due to residual magnetism and this may be insufficient to cause the thyristor 10 to conduct at all. To overcome this difficulty, the apparatus is provided with a bypass circuit to bypass the thyristor 10.

In its simplest form (not shown) this comprises simply a resistor which may be adjustable or variable in series with a diode connected in parallel with the thyristor 10. The value of the resistor is chosen to allow sufficient excitation current to flow, when the thyristor 10 is not conducting, to enable the voltage to build up to a value sufficient to operate the thyristor-firing circuit. As soon as this occurs current begins to flow through the thyristor, and under normal operating conditions the amount of excitation current which continues to flow through the shunt circuit is only a small proportion of the total and does not in any way upset the control exercised by the thyristor 10.

For some requirements the simple arrangement described may not give a sufficiently rapid buildup since if the value of the resistor is reduced too far it will render the control exercised by the thyristor 10 less effective.

In this case the thyristor 10 may be bypassed by a tapped resistor 60 and diode 61, provided with a bypass thyristor 62 connected to bypass the diode 61 and excitation winding 11, and having its trigger and cathode connected respectively to one end and the tapping of the resistor 60.

The bypass resistor 60 may be of relatively small value so as to pass a useful current through the excitation coil in order to start the buildup of excitation, even at a very small value of alternator output voltage. As the latter builds up, and the current through the bypass resistor 60 and diode 61 also builds up, the bypass thyristor 62 begins to conduct so that the bypass current which bypasses the main current control thyristor 10 also bypasses the excitation coil. In other words practically the only current passing through the excitation coil is that passing through the control thyristor which therefore exercises effective control.

The bypass circuit may be connected directly in parallel with the thyristor 10, but preferably, as shown, the resistor 60 is connected to the neutral point 17 rather than to the phase terminal 15. This reduces the voltage applied to it and hence reduces the dissipation of power in the resistor 60.

A requirement may be that the machine should be capable of starting and building up its voltage with a permanently connected load, in which case the voltage produced by the residual magnetism is still further reduced, thus aggravating the difficulty of causing the firing circuit to operate.

To overcome this difficulty a readily saturable current transformer 70 is connected through a rectifier 71 to the excitation winding 11. The current transformer 70 is designed so that at a comparatively small current value it will produce sufficient excitation to provide a voltage which will start the firing circuit, but will then become saturated so that however much the load current increases there will be little further addition to the excitation. This not only has the advantage of providing the required initial excitation under the arduous conditions referred to, without interfering with the control by the thyristor under operating conditions, but it also means that the same current transformer can be employed as a standard item for alternators having a wide range of rated current outputs.

I claim:

1. Apparatus for controlling an electric alternator, comprising:

an excitation coil energized solely by the alternator output for providing excitation of the alternator, means electrically connected to the output of the alternator in series with said excitation coil for controlling the current through said coil under normal operation of the alternator;

means electrically connected to the output of the alternator for providing an initial energization of said excitation coil only in response to any initial current output of said alternator, said means for providing energization having a current transfer characteristic that does not substantially increase with increases in the alternator output current so that only said means for controlling regulates the alternator under conditions other than the initial period of operation of the alternator; and said means for controlling includes a thyristor and said means for providing energization is a saturable current transformer and a rectifier, said transformer including a primary winding connected in the output of the alternator and a secondary winding connected in series with said rectifier, said secondary winding and said rectifier are connected in parallel with said excitation coil.